(12) United States Patent
Hartisch

(10) Patent No.: US 11,807,156 B2
(45) Date of Patent: Nov. 7, 2023

(54) METHOD FOR CALIBRATING A POSITION OF A MATRIX HEADLAMP OF A MOTOR VEHICLE, CONTROL DEVICE, AND MOTOR VEHICLE

(71) Applicant: Audi AG, Ingolstadt (DE)

(72) Inventor: Michael Hartisch, Grünhain-Beierfeld (DE)

(73) Assignee: AUDI AG, Ingolstadt (DE)

( * ) Notice: Subject to any disclaimer, the term of this patent is extended or adjusted under 35 U.S.C. 154(b) by 502 days.

(21) Appl. No.: 16/982,872

(22) PCT Filed: Mar. 1, 2019

(86) PCT No.: PCT/EP2019/055204
§ 371 (c)(1),
(2) Date: Sep. 21, 2020

(87) PCT Pub. No.: WO2019/179753
PCT Pub. Date: Sep. 26, 2019

(65) Prior Publication Data
US 2021/0016705 A1    Jan. 21, 2021

(30) Foreign Application Priority Data

Mar. 22, 2018    (DE) ...................... 10 2018 204 424.4

(51) Int. Cl.
*B60Q 1/00* (2006.01)
*B60Q 1/14* (2006.01)
(Continued)

(52) U.S. Cl.
CPC ........... *B60Q 1/143* (2013.01); *G01M 11/065* (2013.01); *G06T 7/70* (2017.01); *G06V 20/582* (2022.01);
(Continued)

(58) Field of Classification Search
CPC ...... B60Q 1/143; B60Q 2300/30; G06T 7/70; G06T 2207/30252; G06V 20/582; G01M 11/065
(Continued)

(56) References Cited

U.S. PATENT DOCUMENTS 7,432,967 B2    10/2008    Bechtel et al.
8,723,948 B2    5/2014    Gotz et al.
(Continued)

FOREIGN PATENT DOCUMENTS

CN    103344418 A    10/2013
CN    105829856 A    8/2016
(Continued)

OTHER PUBLICATIONS

International Search Report and Written Opinion of the International Searching Authority directed to related International Patent Application No. PCT/EP2019/055204, dated May 24, 2019, with attached English-language translation; 17 pages.
(Continued)

*Primary Examiner* — Tyler J Lee
*Assistant Examiner* — Tiffany P Ohman
(74) *Attorney, Agent, or Firm* — Sterne, Kessler, Goldstein Fox P.L.L.C.

(57) ABSTRACT

The present disclosure relates to a method for calibrating a position of a matrix headlamp of a motor vehicle by means of a camera of the motor vehicle, wherein the matrix headlamp has a plurality of segments controllable independently of one another for light emission. At least one first image of a sign is recorded by means of the camera, a location area in which the sign is arranged is determined, illuminance of a first segment is changed, at least one second image is recorded and checked, whether a change in a glare effect detected on the basis of the at least one recorded (Continued)

second image has occurred, and if so, the position of the matrix headlamp is calibrated depending on the first segment and position information derived from the location area.

10 Claims, 3 Drawing Sheets

(51) Int. Cl.
    *G06T 7/70*     (2017.01)
    *G01M 11/06*     (2006.01)
    *G06V 20/58*     (2022.01)

(52) U.S. Cl.
    CPC .............................. *B60Q 2300/30* (2013.01); *G06T 2207/30252* (2013.01)

(58) Field of Classification Search
    USPC .......................................................... 701/49
    See application file for complete search history.

(56) References Cited

U.S. PATENT DOCUMENTS

| | | | |
|---|---|---|---|
| 9,061,631 B2 | 6/2015 | Totzauer | |
| 9,086,322 B2 | 7/2015 | Roeckl et al. | |
| 9,114,754 B2 | 8/2015 | Ehlgen et al. | |
| 9,802,527 B2 | 10/2017 | Oberhammer et al. | |
| 9,970,752 B2 | 5/2018 | Foltin et al. | |
| 10,151,628 B2 | 12/2018 | Gut | |
| 2008/0231195 A1 | 9/2008 | Kobayashi et al. | |
| 2010/0165102 A1 | 7/2010 | Klebanov et al. | |
| 2013/0049588 A1* | 2/2013 | Foltin | B60Q 1/115 356/4.07 |
| 2014/0217888 A1 | 8/2014 | Hoffmann | |
| 2015/0085507 A1 | 3/2015 | Hoffman | |
| 2016/0257241 A1 | 9/2016 | Hoffmann | |
| 2017/0083774 A1 | 3/2017 | Solar et al. | |
| 2017/0305327 A1 | 10/2017 | Hoffmann et al. | |
| 2020/0114805 A1* | 4/2020 | Ridler | H05B 47/11 |

FOREIGN PATENT DOCUMENTS

| | | | |
|---|---|---|---|
| CN | 107074149 A | 8/2017 | |
| DE | 102007040042 A1 | 2/2009 | |
| DE | 102009040006 A1 | 3/2011 | |
| DE | 102010033351 A1 | 2/2012 | |
| DE | 102011109440 A1 * | 4/2012 | ............... B60Q 1/08 |
| DE | 102011109440 A1 | 4/2012 | |
| DE | 102013201876 A1 | 8/2014 | |
| DE | 102014003585 A1 | 9/2015 | |
| DE | 102014218540 A | 3/2016 | |
| DE | 102014016332 A1 | 5/2016 | |
| DE | 102015203889 A1 | 9/2016 | |
| DE | 102016001915 A1 | 8/2017 | |
| EP | 2204771 A1 | 7/2010 | |
| EP | 2329974 A1 | 6/2011 | |
| EP | 2416139 A1 | 2/2012 | |
| EP | 2562042 A1 | 2/2013 | |
| EP | 2568413 A1 | 3/2013 | |
| EP | 2700536 A2 | 2/2014 | |
| FR | 3051413 A1 | 11/2017 | |
| JP | S6342443 A | 2/1988 | |
| WO | WO 2002/071487 A1 | 9/2002 | |
| WO | WO 2011/110203 A1 | 9/2011 | |
| WO | WO 2013/036188 A1 | 3/2013 | |
| WO | WO 2014/206624 A1 | 12/2014 | |

OTHER PUBLICATIONS

International Preliminary Report on Patentability directed to related International Patent Application No. PCT/EP2019/055204, completed Apr. 1, 2020, with attached English-language translation; 12 pages.

* cited by examiner

METHOD FOR CALIBRATING A POSITION OF A MATRIX HEADLAMP OF A MOTOR VEHICLE, CONTROL DEVICE, AND MOTOR VEHICLE

TECHNICAL FIELD

The present disclosure relates to a method for calibrating a position of a matrix headlamp of a motor vehicle by means of a camera of the motor vehicle, wherein the matrix headlamp has a plurality of segments controllable independently of one another for light emission. The present disclosure also includes a control device for a motor vehicle and a motor vehicle.

BACKGROUND

Matrix headlamps for motor vehicles are known from the prior art. These usually have a plurality of segments arranged in a row or even in a plurality of rows, each of which is individually controllable. For example, each segment can comprise one or a plurality of LEDs. In addition, a respective segment can be switched on or off or dimmed in any manner depending on the situation or the light distribution to be provided. This makes it possible to provide particularly flexible and situation-adapted light distributions. For example, this can be used to provide a high beam, which automatically blocks oncoming traffic participants. For this purpose, oncoming traffic participants can be detected with a motor vehicle camera, typically a front camera, and the position thereof can be determined, and then the corresponding segments of the matrix headlamp can be controlled accordingly to reduce the illuminance in the area of the oncoming traffic participant, for example to the illuminance of the normal low beam. To achieve this, it is necessary to reference and calibrate the respective headlamp segment border in relation to the front camera. This is due to the fact that when a headlamp is installed, installation tolerances cause various deviations of the actual position of the matrix headlamp from a target position or reference installation position. This deviation must be determined in the course of the calibration, for example to enable a precise suppression of vehicles.

To date, vehicles with matrix headlights, for example with matrix LED light, are calibrated in an additional work step in production and also in customer service. This calibration requires a time-consuming process in production and high-precision optical measuring equipment must be used. In case of customer service, a recalibration has to be performed, which is expensive and time consuming. In addition, the calibration is static and is not adapted via dynamic situations in the vehicle lifetime. If, for example, the calibrated position changes over the years, for example due to material fatigue or other age-related and/or stress-related phenomena, this usually goes unnoticed by the driver for a very long time and can in addition be remedied only by another costly and time-consuming recalibration.

DE 10 2011 109 440 A1 describes a method for adjusting and/or calibrating at least one headlamp of a vehicle, wherein images of a vehicle environment located in front of the vehicle and illuminated by the at least one headlamp are detected by means of a detection unit. The images are read out pixel by pixel and, while retaining row and/or column information, a matrix structure is determined in which horizontally and/or vertically of a light/dark border and a deviation of the light/dark border from a specified nominal value are determined, wherein the headlamp is calibrated or adjusted on the basis of the determined deviation. However, this method allows only a very rough calibration of a headlamp to be performed, since the light/dark border can generally only be determined relatively imprecisely on the basis of image recordings. In addition, this requires favorable environmental conditions, for example little disturbing light and good weather conditions, as well as a very high quality and therefore expensive camera.

DE 10 2015 203 889 A1 describes a method for calibrating an illumination apparatus having a plurality of illuminating means as a light source. An overlap-free distribution of the individual light distributions of the individual illuminating means is generated, the light distribution is recorded with a sensor and a characteristic of the individual light distributions is determined and finally the illumination apparatus is calibrated on the basis of a comparison of the at least one characteristic of different illuminating means relative to one another and/or to the predeterminable nominal data. In this case, however, the illuminating means are to be calibrated relative to one another and not the position of the entire headlamp relative to the motor vehicle or camera.

DE 10 2014 003 585 A1 describes a method and an apparatus for the automatic adjustment of a front headlamp. However, this method is only used for headlamp adjustment of a headlamp.

WO 2014/206624 A1 describes a method for calibrating the position of a vehicle headlamp, wherein the complete headlamp is displaced. The position of the point of maximum light intensity is determined and, based thereon, so is the position of the headlamp in relation to the motor vehicle.

WO 2011/110203 A1 describes a method for calibrating an optical unit of a motor vehicle, wherein a target object is positioned in a light distribution. The light distribution is generated using a first optical unit formed as a light unit, and a relative position of the illuminated target object relative to the motor vehicle is determined using a calibrated sensor, wherein a calibration point is determined based on the relative position and parameters of the light distribution, wherein the calibration point represents an actual relative position of the target object as a function of respectively adjusted parameters of the light unit.

DE 10 2010 033 351 A1 describes a method for calibrating a headlamp of a motor vehicle which is controllable for segmental illumination of an illumination area, wherein a calibration measurement for a segment is performed when only the segment is illuminated, and wherein the calibration information to be used for the illumination of the segment is determined from the measurement results and is related to the situation of the segment.

BRIEF DESCRIPTION OF DRAWINGS/FIGURES

Figure 4:
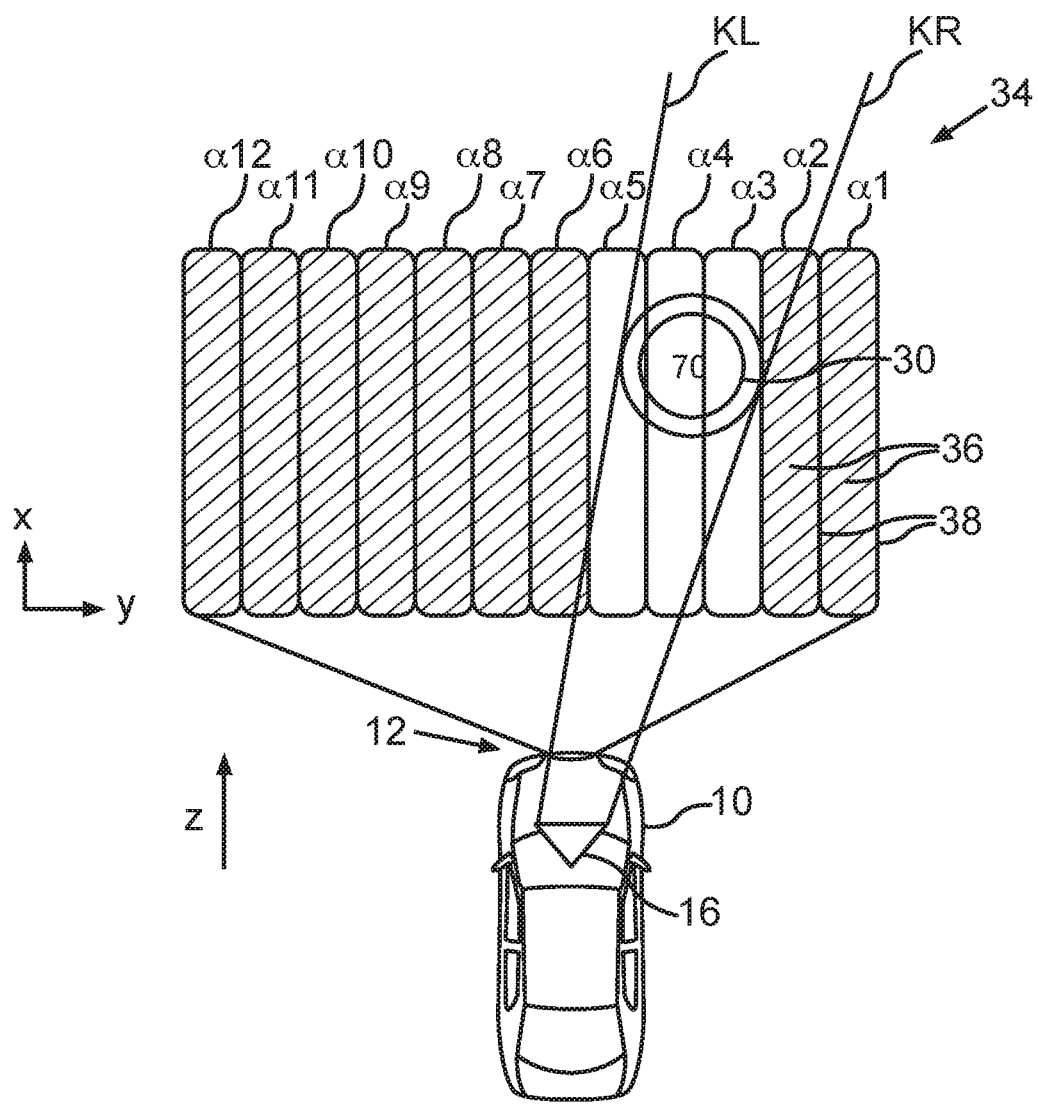

FIG. 4 shown a schematic representation of an environmental illumination of an environment of the motor vehicle generated by a matrix headlamp having a sign arranged in the environment, in accordance with some embodiments.

DETAILED DESCRIPTION

The object of the present disclosure is therefore to provide a method for calibrating a position of a matrix headlamp of a motor vehicle, in particular with respect to a motor vehicle coordinate system, as well as a control device and a motor vehicle, which enable the matrix headlamp to be calibrated as simply and accurately as possible.

This object is solved by a method, a control device and a motor vehicle having the characteristics according to the respective independent claims. Advantageous designs of various embodiments, as described herein, are the subject of the dependent claims, the description as well as the drawings.

In some embodiments, a method for calibrating a position of a matrix headlamp of a motor vehicle by means of a camera of the motor vehicle is disclosed, wherein the matrix headlamp has a plurality of segments controllable independently of one another for light emission, at least a first image of a sign located in an environment of the motor vehicle is recorded by means of the camera and a location area in which the sign is arranged is determined on the basis of the at least one recorded image, wherein the location area is determined with respect to a coordinate system fixed to the motor vehicle, which is also referred to as the motor vehicle coordinate system. Furthermore, an illuminance or light intensity of a first segment of the plurality of segments is changed and at least one second image is captured by means of the camera. After the illuminance or light intensity has been changed, a check is performed to see whether there has been a change in a glare effect detected on the basis of the at least one second image taken, and if there has been a change in the glare effect, the position of the matrix headlamp is calibrated in relation to the first segment and position information derived from the location area.

Signs, in particular traffic signs, street signs, location signs, or similar signs, have a very high reflectivity compared to the rest of the environment. When such a sign is illuminated by the headlamp of the motor vehicle, the headlamp light reflected by the sign and detected by the camera produces a measurable glare effect. With the same illuminance in relation to a surface unit of the sign area, the larger the area of the sign illuminated by the headlamp, the greater the glare effect. In some embodiments, by way of a non-limiting example, the glare effect can be measured on the basis of the amount of light or illuminance impinging on one or a plurality of pixels of the camera sensor. Thus, if a change in the illumination of the sign is caused by a change in the illuminance or the light intensity of the first segment, this can be detected by the camera due to the resulting glare effect. In some embodiments, by way of a non-limiting example, the camera of the motor vehicle is preferably a calibrated camera, in such a manner that the corresponding object coordinates of the sign in the motor vehicle coordinate system can be calculated on the basis of the first image. The calibration of the cameras and the calculation of object coordinates of the objects detected in camera images is sufficiently well known from the prior art, thus it will not be explained in detail here. On the basis of the knowledge thus obtained of the location area of the sign, i.e. the position of the sign in the coordinate system fixed to the motor vehicle, and on the basis of the knowledge gained that a given first segment illuminates at least one sign area, which can be obtained from the change in glare effect when the illuminance of the segment in question changes, it is advantageous to calibrate the position of the matrix headlamp. This makes it advantageously possible to calibrate the matrix headlamp simply by driving past traffic signs or other signs. This calibration method can therefore be performed while driving, for example, and does not necessarily have to be performed in advance when the motor vehicle is manufactured. In particular, this makes it possible to dispense with a time-consuming process specifically intended for calibration under defined conditions with measuring equipment or similar. Nevertheless, this calibration method can also be performed before the motor vehicle is delivered to a customer. In this case, too, the calibration effort is significantly reduced compared to conventional methods, since no optical measuring equipment external to the vehicle is required to measure the segment borders of the headlamp. However, this method can be performed permanently while driving, or at least very often under certain conditions, which will be explained in more detail later, in such a manner that changes in the already calibrated position of the matrix headlamp due to aging and/or stress can also be directly detected and taken into account by the repeatedly performed calibration. This can significantly increase road safety.

Accordingly, in some embodiments, a much less complex, particularly simple, cost-effective and very accurate calibration method for calibrating the position of the matrix headlamp in relation to the vehicle coordinate system can be provided.

In accordance with some embodiments, the change in the illuminance of a segment is the change in the light flux generally impinging on a specific unit surface at a specific unit distance from the segment. The change in the light intensity generally refers to the change in the light flux emitted by the segment in a unit space angle area. When the respective segment is controlled to change the light radiation behavior thereof, both the light flux emitted into a defined unit space angle area and the light flux impinging on a defined unit surface at a defined distance from the segment is thus generally changed.

In some embodiments, as described above, the matrix headlamp may have a plurality of segments arranged in a row. By way of a non-limiting example, the matrix headlamp may have a plurality of such rows, each having a plurality of segments. However, it may also be provided that the matrix headlamp has a single row having a plurality of segments, for example between 7 and 32 segments depending on the design of the headlamp. For example, a respective segment may comprise one LED, particularly a single LED. However, it is also conceivable to assign a plurality of LEDs to a respective segment. By way of a non-limiting example, the matrix headlamp may comprise one, two or three such LED or segment rows. These one or plurality of segment rows preferably extend substantially in the horizontal direction, i.e., perpendicular to the vertical axis of the motor vehicle, or at least such a segment row can be used to provide a light distribution consisting of individual portions assigned to the respective segments, wherein these individual portions extend adjacent to one another in the horizontal direction. Such a horizontal distribution of illumination corresponding to the segment row can also be provided by means of suitable optical members, even if the segment row itself is not arranged horizontally.

In some embodiments, a reference installation position of the headlamp in the motor vehicle coordinate system and a maximum tolerance deviation of the headlamp from the reference installation position in at least one direction are predetermined, in particular again preferably in the horizontal direction, and furthermore a space angle area with respect to a coordinate system fixed to the headlamp is assigned to a respective segment of the headlamp and this assignment is also predetermined. This predefined information can now be used advantageously to calibrate the position of the matrix headlamp.

In some embodiments, in accordance with the specified assignment, a respective headlamp segment illuminates a space angle area assigned to it, at least when switched on. These space angle areas assigned to the respective segments as well as the arrangement of the respective segments relative to one another can be measured before the headlamp is installed in the motor vehicle and are therefore known. This assignment, as well as the other predefined information, can be stored in a memory of the motor vehicle. Where a headlamp is reciprocally incorporated with the motor vehicle, the installation position of the headlamp in relation to the vehicle coordinate system is also known at least approximately, in such a manner that it is at least approximately identical to that of the reference installation position, particularly with the exception of the deviation from this reference installation position which has to be calibrated. During calibration, exactly this offset between the actual installation position and the reference installation position is determined or at least approximated. Initially, i.e., before calibration, a theoretical maximum tolerance deviation is therefore assumed. This tolerance is such that it is certainly greater than the actual deviation of the headlamp position from the reference installation position. The maximum tolerance deviation can, for example, be an empirically obtained or an estimated value based on experience. This also makes it possible, for example, to use headlamp functions such as the suppression of preceding or oncoming vehicles in the high beam function right from the start, i.e., even before the matrix headlamp is calibrated, for example, by always taking this maximum tolerance deviation into account during the suppression. This means that, for safety reasons, a much larger area is suppressed than is actually necessary, i.e., after calibration, to ensure that oncoming traffic is not dazzled.

In some embodiments, if the sign is recognized on the basis of the at least one first image, depending on the reference installation position, the maximum tolerance deviation, the assignment and the location area of the sign determined on the basis of the at least one first image, those first segments are determined by calculation through which, taking into account the tolerance deviation, location angle areas relative to the motor vehicle coordinate system can be illuminated in which the sign is arranged, and the illuminance or light intensity of the first segments determined, particularly only of the first segments determined, is at least reduced, or these are switched off completely.

In some embodiments, to recognize the sign, particularly a traffic sign, conventional traffic sign recognition algorithms, or in general sign recognition algorithms, can be used. Thus, if a sign is recognized on the basis of the first image, the location coordinates thereof are determined in relation to the vehicle coordinate system and then those segments of the matrix headlamp which illuminate the recognized sign are switched off or at least reduced in the illuminance or light intensity thereof, and possibly also additional segments which may not actually illuminate the sign at all, but which could theoretically illuminate the sign due to the still undefined tolerance deviation. Accordingly, only areas around the sign are illuminated by the headlamp to an extent that is not reduced in terms of illuminance, but not the sign itself.

In some embodiments, after reducing the illuminance or light intensity of the determined first segments, the illuminance or light intensity of at least some of the respective determined first segments is successively increased in a predetermined sequence up to a defined maximum value until the change in glare effect is detected. If the individual segments are switched on one after the other in the predetermined order or the intensities thereof are increased sequentially, it can be checked after each increase whether the change in the glare effect detected by means of the camera has occurred. This means that the sign is first faded out by switching off or reducing the illuminance or light intensity of the first segments in the sign area, and subsequently this faded out area is reduced further and further, namely by sequentially switching on the first segments, whose light intensity has at least been reduced, until the camera detects a significant increase in glare effect. If, for example, a change in the glare effect is recognized immediately after the first of these first segments has been switched on again or the illuminance or light intensity thereof has been increased to the maximum value, the remaining first segments are not switched on, at least not as long as the sign is still in the field of view of the camera. At this point it is only then known that the last segment to be switched on illuminates at least one edge area of the sign. The object coordinates of the edge area of the sign are known, since these can be determined from the recorded camera image just like the location area of the entire sign. Accordingly, it is then known that this edge area of the sign lies in a space angle area assigned to the first segment in question. This information can therefore be advantageously used to calibrate the segment borders.

In some embodiments, the change in the glare effect can be detected particularly reliably if the change between the state in which the sign is not illuminated by the headlamp and the state from which at least part of the sign is illuminated by a segment of the headlamp occurs according to this sequential switching of the segments. This makes the method particularly accurate and reliable. Furthermore, it is also conceivable that the first segments, once the sign has been recognized in the first image, are not switched off simultaneously but sequentially, or at least the illuminance or light intensity thereof is reduced, in such a manner that the calibration information can already be obtained in the same manner when the individual segments are switched off. If, for example, the sign is actually illuminated by only one of the first segments after some of the calculated first segments have already been switched off, and this is then switched off, this in turn manifests itself in a significant reduction of the glare effect which can be detected by the camera. This also allows the position of the sign edge to be correlated with the space angle area of the last segment that was switched off, and calibration information can be obtained from this to calibrate the segment borders.

In some embodiments, simultaneous switching off of all the first segments determined by calculation may avoid or reduce dazzling of the driver due to reflections of the headlamp light on the sign. It is also conceivable that instead of switching off only the first segments detected or reducing the illuminance thereof, all segments should be switched off or the illuminance or light intensity thereof reduced when a sign is detected and then the illuminance or light intensity of the respective segments should be increased again sequentially until the change in glare effect is detected by the camera. By way of a non-limiting example, it is preferred that the calibration method is performed only at night and with the high beam function activated. Accordingly, this latter variant would have the effect that the high beam would be completely switched off, at least for a short time, which even for very short periods of time may be visually registered by the driver and perceived as annoying. It is, therefore, particularly advantageous not to switch off all segments or reduce the illuminance or light intensity thereof when a sign is detected, but only the first segments determined by calculation, through which the location area of the sign can be illuminated, taking into account the maximum tolerance deviation. This function, therefore, has the advantage of simultaneously dazzling the sign, whereby the dazzling of the driver by signs illuminated by the headlamp, particularly the high beam, can be avoided, wherein in addition it is advantageous to perform a calibration of the headlamp.

In some embodiments, if the individual segments that were switched off are switched on again sequentially or the illuminance or light intensity thereof is increased, this preferably occurs starting from an edge area of the row in which these first segments are arranged. This means that the first segments are preferably arranged in a row, and the increase of illuminance or light intensity according to the predetermined order occurs along the row. It is irrelevant from which end of the row is started, but it is preferably known. This information can in fact be used to determine which edge area of the sign, i.e., the left or the right in relation to the driving direction, is now illuminated by the corresponding first segment of the headlamp, if the significant increase in glare effect is recognized by the camera. The position information or the location coordinates of the edge area in question then represent the position information derived from the location area, depending on which of the matrix headlamps is calibrated, which allows particularly accurate calibration.

In some embodiments, an approximate value for an actual tolerance deviation of the position of the matrix headlamp from the reference installation position is determined during the calibration of the position of the matrix headlamp as a function of the determined first segment and the position information derived from the location area such as the location coordinates of the edge of the sign. This can occur as described above. Since the light cones generated by the individual segments have a certain extension horizontally, depending on the distance from the headlamp, the relative location of the space angle area associated with the specific first segment to the illuminated edge area of the sign can also only be determined up to a certain degree of accuracy, at least on the basis of a single measurement. Therefore, a single measurement can only give an approximate value for the actual tolerance deviation of the position of the headlamp from the reference installation position. However, as the number of measurements increases, this approximate value can be determined with increasing accuracy in relation to the actual tolerance deviation.

In some embodiments, if the determined approximate value is updated in the case of a second sign recorded. In particular, this update may occur in accordance with the method described above according to some embodiments. The described method is therefore repeated continuously, wherein the accuracy of the calibration of the position increases accordingly. The recorded measurement data can then be evaluated according to a self-learning statistics function, for example.

In some embodiments, it is provided that the determined approximate value, particularly in addition to a defined safety value, is set as a new maximum tolerance deviation. The new maximum tolerance deviation therefore also approaches the actual deviation of the position of the headlamp from the reference position more and more accurately with each measuring step. Accordingly, any dazzling, for example of oncoming traffic when it is suppressed from the high beam, can be avoided to ensure safety. It is, therefore, advantageous that the calibration value, i.e., the approximate value for the actual tolerance deviation, particularly taking into account the safety value, can be reduced by a fixed angular area for each recognized traffic sign via the self-learning statistics function.

In accordance with some embodiments, if the calibration is performed only at night and particularly only with the high beam function activated. Performing the calibration only at night, i.e., for example between defined times or only when the environmental brightness falls below a certain threshold, has the great advantage that disturbing environmental light such as sunlight and scattered light is reduced to a minimum, which makes the calibration much more accurate. In addition, since the high beam function allows significantly higher illuminances or light intensities, which in turn lead to the described changes in glare effect being more significant, the accuracy of the calibration can also be significantly increased.

By way of a non-limiting example, when it is nighttime and provided that the high beam function is active, the calibration method is preferably performed for each sign detected, particularly traffic signs. In this manner it can be advantageously achieved that even if an already calibrated position changes in the course of time, for example over the years, this is immediately taken into account by the repeatedly performed calibration method. This can significantly increase safety in road traffic, therefore it is impossible for oncoming traffic to be dazzled by an uncalibrated headlamp or a headlamp that has moved unnoticed from a calibrated position.

In some embodiments, a control device for a motor vehicle is disclosed, which is adapted to calibrate a position of a matrix headlamp of the motor vehicle, wherein the control device is adapted to control a plurality of segments for light emission of the matrix headlamp independently of one another. In addition, the control device is designed to determine, on the basis of at least a first image of a sign in an environment of the motor vehicle, taken by means of a camera of the motor vehicle, a location area in which the sign is located with respect to a coordinate system fixed to the motor vehicle, also called motor vehicle coordinate system. In addition, the control device is designed to change an illuminance or light intensity of a first segment of the plurality of segments, particularly as a result of the recognized sign, and, after changing the illuminance or light intensity on the basis of at least one second image recorded by means of the camera, to check whether a change in a glare effect detected on the basis of at least one second image recorded by the camera has occurred. In addition, if a change in the glare effect has occurred, the control device is designed to calibrate the position of the matrix headlamp in relation to the first segment and a position information derived from the location area.

In some embodiments, a motor vehicle having a control device is disclosed, according to various embodiments, as described herein.

The advantages described with respect to the method and the embodiments thereof apply equally to the control device and to the motor vehicle. In addition, the method steps described in connection with the method according to various embodiments and the design thereof enable the further development of the control device according to various embodiments and of the motor vehicle according to various embodiments.

The present disclosure also comprises the combinations of the described embodiments.

Embodiments of the present disclosure are described below with reference to the drawings.

The embodiments explained below are preferred embodiments in which the components of the embodiments that are described each constitute individual features to be considered independently of one another and also to be considered in a combination that is different from the combination described above. In addition, the embodiments described can also be supplemented by further features, which have already been described herein.

In the drawings, functionally identical members are each denoted with the same reference signs.

Figure 1:
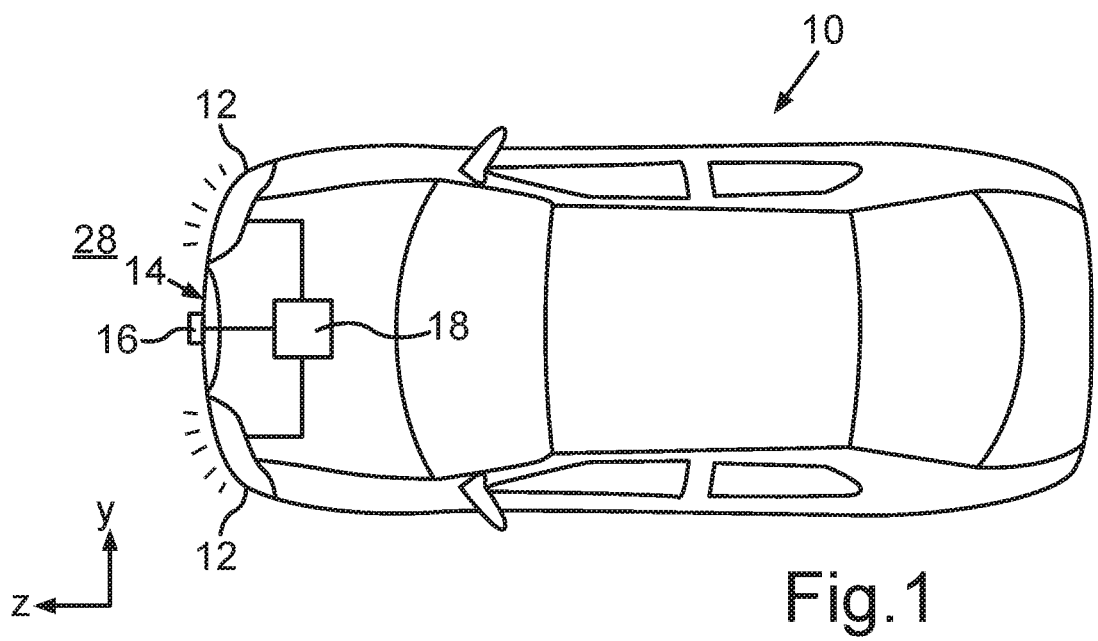
FIG. 1 shows a schematic representation of a top view of a motor vehicle having two matrix headlamps, in accordance with some embodiments.

FIG. 1 shows a schematic representation of a motor vehicle 10 having two matrix headlights 12, which are formed as front headlights, a front camera 16 arranged at the front of the vehicle 14, and a control device 18 according to an embodiment example of the invention. The control device 18 is coupled to both the camera 16 and the respective matrix headlights 12 and is designed to perform the calibration of the position of the matrix headlamps 12 relative to the camera 16. The calibration of the right and left matrix headlamp 12 occurs in the same manner and is therefore only explained below in relation to a single matrix headlamp 12.

Figure 2:
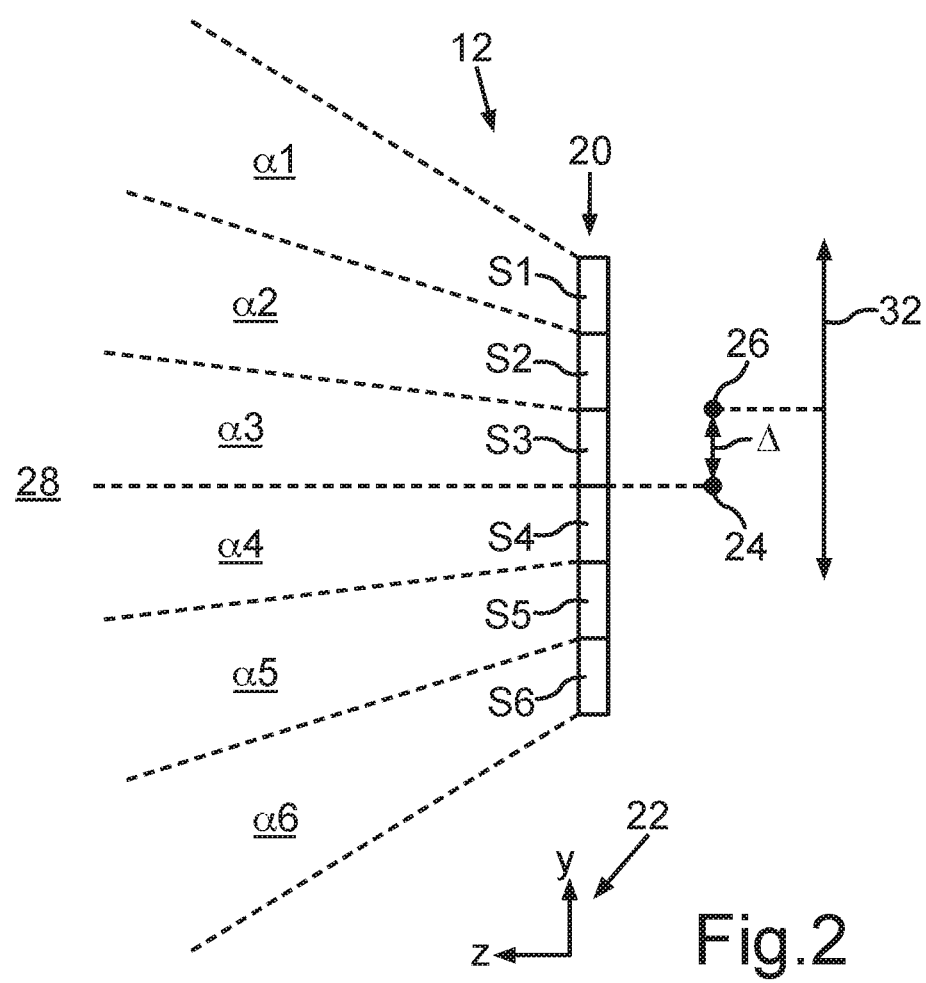
FIG. 2 shows a schematic representation of a matrix headlamp for a motor vehicle, in accordance with some embodiments.

Such a matrix headlamp 12 is schematically shown in detail in FIG. 2. The matrix headlamp 12 has a sample of six segments S1, S2, S3, S4, S5, S6 arranged in a row 20 extending along the y-axis of the displayed vehicle coordinate system 22, wherein a respective segment S1, S2, S3, S4, S5, S6 comprises an LED. The respective segments S1, S2, S3, S4, S5, S6 are independently controllable by the control device 18, whereby the illuminance or light intensity thereof can be adjusted independently of one another. A respective segment S1, S2, S3, S4, S5, S6 is assigned a corresponding space angle area $\alpha 1$, $\alpha 2$, $\alpha 3$, $\alpha 4$, $\alpha 5$, $\alpha 6$. This assignment may be defined in relation to a headlamp fixed coordinate system of which only the origin 24 thereof is shown here as a point. This origin 24 may simultaneously define the actual position of the matrix headlamp 12 in relation to the motor vehicle coordinate system 22. When the motor vehicle headlamp 12 is fitted to the motor vehicle 10, there will inevitably be more or less significant deviations relative to a designated reference installation position 26. This deviation $\Delta$ should be calibrated as accurately as possible in accordance with the calibration method described in more detail below, therefore allowing, for example, a precise suppression of other traffic participants with the high beam function by dimming or switching off the corresponding segments S1, S2, S3, S4, S5, S6.

Figure 3:
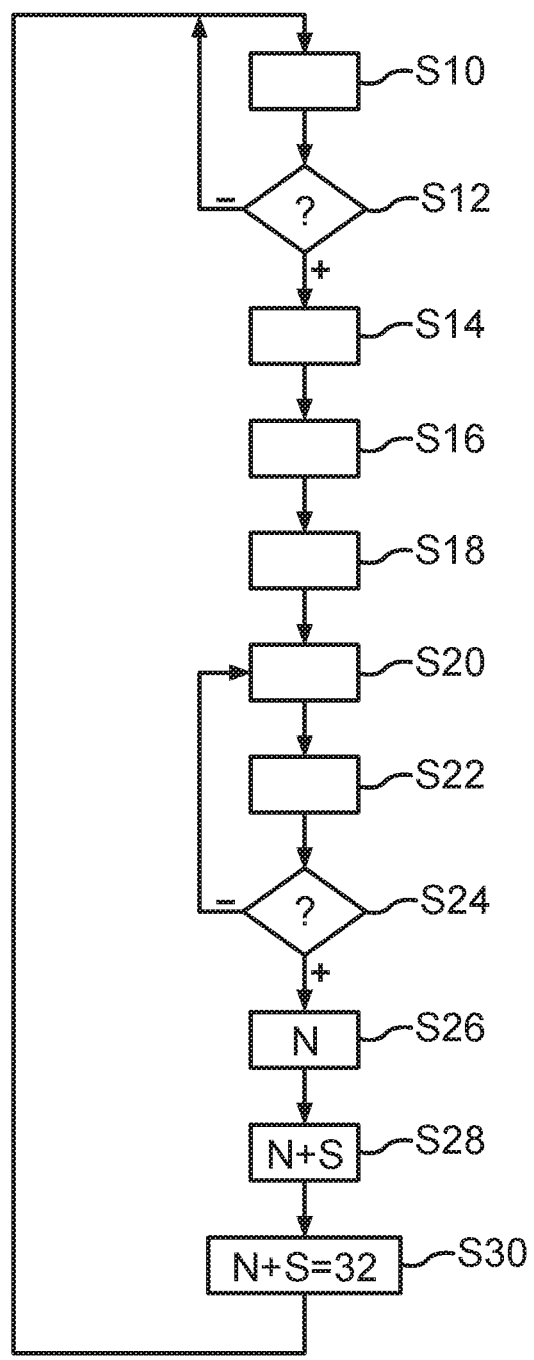
FIG. 3 shows a flow chart illustrating a method of calibrating a matrix headlamp, in accordance with some embodiments.

FIG. 3 shows a flow chart illustrating a method of calibrating the matrix headlamp 12 according to an embodiment of the invention. Preferably, this auto-calibration function is only activated at night and when the high beam is activated.

At least one image of the environment 28 (see FIG. 1 and FIG. 2) is taken by the front camera 16 of the motor vehicle 10 in step S10, and in step S12 it is checked whether a sign 30 (see FIG. 4) is present in the environment 28 of the motor vehicle 10 on the basis of the respective image taken. This step order is performed in such a manner until a sign 30 is recognized in step S12. The recognition of signs 30 can be based on well-known sign recognition algorithms. If a sign 30 is recognized, the position or location area of the sign 30 in relation to the motor vehicle coordinate system 22 is determined in step S14. Subsequently, in step S16, those segments S1, S2, S3, S4, S5, S6 which would at least theoretically be able to illuminate the sign 30, taking into account the maximum tolerance deviation 32, are determined arithmetically depending on the reference installation position 26, a predetermined maximum tolerance deviation 32 (see FIG. 2) and the predetermined assignment of the individual segments S1, S2, S3, S4, S4, S5, S6 to the location angle areas $\alpha 1$, $\alpha 2$, $\alpha 3$, $\alpha 4$, $\alpha 5$, $\alpha 6$, and on the basis of the determined location area of the sign 30.

The assumed tolerance deviation 32 is shown in FIG. 2 and is selected in such a manner that it is in any case greater than the as yet unknown deviation $\Delta$ of the actual position 24 from the reference position 26. Headlamp delivery tolerances and installation tolerances in the vehicle can, for example, be determined by means of tolerance chain examinations and stored as calibration information, i.e., as maximum tolerance deviation 32, in the matrix beam algorithm in the control device 18. However, these tolerances are large enough to ensure that no dazzling effects are caused by the darkness gap during operation. This means that the maximum tolerance deviation 32 can be determined from these examinations, which is always greater than the actual deviation $\Delta$.

The segments S1, S2, S3, S4, S5, S6 calculated in such a manner are subsequently at least reduced or switched off in the illuminance or light intensity thereof in step S18. Subsequently in step S20 a very first of these segments S1, S2, S3, S4, S5, S6 is increased again with respect to the illuminance or light intensity thereof, particularly up to a predetermined maximum value, then in step S22 a further image of the environment 28 is recorded with the sign 30 and in step S24 it is checked whether there is or has been an increased glare effect caused by the headlamp light reflected by the sign 30. If there is no glare effect, step S20 is resumed and the next segment S1, S2, S3, S4, S5, S6 is switched on or the illuminance or light intensity thereof is increased up to the maximum value, after which in step S22 an environmental image is again recorded with the sign 30 and in step S24 it is again checked whether there is now a significant change in the glare effect. The previously calculated segments S1, S2, S3, S4, S5, S6, whose light intensity has been reduced, are therefore sequentially increased again to the predetermined maximum value of the light intensity thereof until a change in the glare effect is finally detected in step S24. A calibration of the position of the matrix headlamp 12 subsequently occurs as a function of the segment S1, S2, S3, S4, S5, S6, which was last increased in illuminance or light intensity thereof, and as a function of the location area of the sign 30 or information derived from it, such as the position of the edge of the sign 30. For this purpose an approximate value N of the deviation $\Delta$ is determined in step S26, an additional safety value S is added to this approximate value N in step S28 and the resulting value is set equal to a new maximum tolerance deviation 32 in step S30 and the method starts over again.

For each traffic sign 30 recorded, the accuracy of the calibration is therefore improved and the approximate value N increasingly approaches the actual deviation $\Delta$.

FIG. 4 shows a schematic representation of the motor vehicle 10 and the light distribution 34 produced by a matrix headlamp 12 of the motor vehicle 10 in a cross-section perpendicular to the horizontal, as well as a sign 30 illuminated by the light distribution 34.

In this example, the matrix headlamp 12 has unspecified segments, each of which has a corresponding space angle $\alpha 1$, $\alpha 2$, $\alpha 3$, $\alpha 4$, $\alpha 5$, $\alpha 6$ $\alpha 7$, $\alpha 8$, $\alpha 9$, $\alpha 10$, $\alpha 11$, $\alpha 12$, shown here in the x-y-plane. In this manner there are twelve corresponding illuminating portions 36 in this cross-sectional plane, i.e., in the x-y plane, of which only two are provided with a reference mark for reasons of clarity, and which are bounded in the y-direction by respective segment borders 38, of which also for reasons of clarity only two are provided with a reference mark.

If the motor vehicle 10 is driving on a road with the lights switched on, particularly with the high beam on, and if there is a traffic sign 30 in the environment 28 of the motor vehicle 10, it will be detected by the front camera 16. Particularly the location area of this sign 30 can be determined. In addition, the left and right object edges KL, KR of the sign 30 can be detected by means of the front camera 16 and the positions thereof can be determined as position information derived from the location area.

It can subsequently be calculated by which segments of the matrix headlamp 12 the location area of this sign 30 can theoretically be illuminated, taking into account the maximum tolerance deviation 32. The illuminance or light intensity of the calculated segments is subsequently reduced. In this example, this concerns the segments to which the space angles $\alpha 3$, $\alpha 4$ and $\alpha 5$ are assigned. Now these calculated segments are reduced with respect to the illuminance or light intensity thereof. The illuminance or light intensity is subsequently increased again starting from an edge in the y-direction of the respective calculated segments. In this example, you can therefore start with the segments to which the space angles $\alpha 3$ or $\alpha 5$ are assigned. For example, if the illuminance or light intensity is increased in the segment to which the space angle $\alpha 3$ is assigned, this leads to illumination of the right edge area KR of the sign 30, which can be detected by the front camera 16 due to a resulting glare effect. Accordingly, the determined position of the right object edge KR can now be used to calibrate the segment borders 38, which are assigned to the segment of the matrix headlamp 12 radiating into the space angle $\alpha 3$. In particular the other segment borders 38 can also be calibrated on this basis, since the arrangement of the respective segment borders 38 to each other or the assignment of the respective space angle areas $\alpha 1$, $\alpha 2$, $\alpha 3$, $\alpha 4$, $\alpha 5$, $\alpha 6$ $\alpha 7$, $\alpha 8$, $\alpha 9$, $\alpha 10$, $\alpha 11$, $\alpha 12$ to the segments of the motor vehicle headlamp 12 is known by the assignment described above and stored in a memory of the control device 18. In this manner it is possible to proceed with each detected sign 30, which increases the accuracy of the calibration of the segment borders 38 increasingly. Using a self-learning statistics function, the calibration value, i.e., the approximate value N, can be reduced by a fixed angle area (I controller) for each traffic sign 30 recognized. The rule is designed as if it should prevent any jumps in the nominal value setting, wherein the jumps refer to the change in illuminance or light intensity. Fixed minimum limits are defined as safety functions to prevent any dazzling.

Altogether, the examples show how various embodiments described herein can provide a calibration method, a motor vehicle and a control device which enable a particularly simple and low-cost calibration of the matrix headlamp without the need for long calibration times and complex measuring technique in production and without the need for service time in customer service. This is made possible by a self-learning system which compensates for adjustment tolerances and, advantageously, allows automatic calibration of the matrix segments even during normal driving operation.

The invention claimed is:

1. A method for calibrating a position of a matrix headlamp of a motor vehicle comprising a camera, wherein the matrix headlamp has a plurality of segments controllable independently of one another for light emission, the method comprising:
recording at least one first image of a sign arranged in an environment of the motor vehicle using the camera, wherein illumination of the sign by the matrix headlamp leads to a measurable glare effect by a headlamp light reflected by the sign and detected by the camera;
based on the at least one first image recorded, determining a location area in which the sign is arranged with respect to a coordinate system according to the motor vehicle;
changing illuminance of a segment of the plurality of segments;
recording at least one second image using the camera;
determining, after changing the illuminance of the segment of the plurality of segments, whether a change in glare effect has occurred based on the at least one second image recorded, wherein the glare effect is measured based on the illuminance impinging on at least one pixel of a plurality of pixels of image data obtained by a sensor of the camera;
upon determining that the change in the glare effect has occurred, calibrating the position of the matrix headlamp depending on the segment and position information derived from the location area; and
determining, during the calibrating, an approximate value for an actual tolerance deviation of the position of the matrix headlamp from a reference installation position.

2. The method of claim 1, further comprising:
determining the reference installation position of the matrix headlamp in the coordinate system according to the motor vehicle and a maximum tolerance deviation of the matrix headlamp from the reference installation position in at least one direction; and
determining an association between the segment of the matrix headlamp and a corresponding space angle area of a plurality of space angle areas with respect to a coordinate system according to the headlamp.

3. The method of claim 2, further comprising:
in response to recognizing the sign based on the at least one first image, determining the segment as a function of the reference installation position, the maximum tolerance deviation, the association between the segment and the corresponding space angle, and the location area of the sign by taking into account the maximum tolerance deviation and the plurality of space angle areas that can be illuminated in relation to the coordinate system according to the motor vehicle in which the sign is arranged; and
determining illuminance of the segment for reduction.

4. The method of claim 3, further comprising:
increasing illuminance of another segment of the plurality of segments in a predetermined order up to a predetermined maximum value after reduction of the illuminance of the segment until the change in glare effect is detected.

5. The method of claim 1, wherein the determined approximate value is set as a new maximum tolerance deviation.

6. The method of claim 1, wherein a combination of the determined approximate value and a defined safety value is set as a new maximum tolerance deviation.

7. The method of claim 5, further comprising updating the determined approximate value in response to detection of a second sign.

8. The method of claim 1, further comprising performing calibration at night or upon activation of a high beam function.

9. A control device coupled to a camera and a matrix headlamp, and configured to calibrate a position of the matrix headlamp of a motor vehicle by controlling a plurality of segments for light emission of the matrix headlamp independently of one another, wherein the control device is further configured to:
  record at least one first image of a sign arranged in an environment of the motor vehicle using the camera, wherein illumination of the sign by the matrix headlamp leads to a measurable glare effect by a headlamp light reflected by the sign and detected by the camera;
  based on the at least one first image recorded, determine a location area in which the sign is arranged with respect to a coordinate system according to the motor vehicle;
  change illuminance of a segment of the plurality of segments;
  record at least one second image using the camera;
  determine, after changing the illuminance of the segment of the plurality of segments, whether a change in glare effect has occurred based on the at least one second image recorded, wherein the glare effect is measured based on the illuminance impinging on at least one pixel of a plurality of pixels of image data obtained by a sensor of the camera;
  upon determining that the change in the glare effect has occurred, calibrate the position of the matrix headlamp depending on the segment and position information derived from the location area; and
  determine, during the calibrating, an approximate value for an actual tolerance deviation of the position of the matrix headlamp from a reference installation position.

10. A motor vehicle, comprising
  a control device;
  a camera; and
  a matrix headlamp,
  wherein the control device is coupled to the camera and the matrix headlamp, and configured to calibrate a position of the matrix headlamp by controlling a plurality of segments for light emission of the matrix headlamp independently of one another, wherein the control device is further configured to:
  record at least one first image of a sign arranged in an environment of the motor vehicle using the camera, wherein illumination of the sign by the matrix headlamp leads to a measurable glare effect by a headlamp light reflected by the sign and detected by the camera;
  based on the at least one first image recorded, determine a location area in which the sign is arranged with respect to a coordinate system according to the motor vehicle;
  change illuminance of a segment of the plurality of segments;
  record at least one second image using the camera;
  determine, after changing the illuminance of the segment of the plurality of segments, whether a change in glare effect has occurred based on the at least one second image recorded, wherein the glare effect is measured based on the illuminance impinging on at least one pixel of a plurality of pixels of image data obtained by a sensor of the camera;
  upon determining that the change in the glare effect has occurred, calibrate the position of the matrix headlamp depending on the segment and position information derived from the location area; and
  determine, during the calibrating, an approximate value for an actual tolerance deviation of the position of the matrix headlamp from a reference installation position.

* * * * *